United States Patent
Sanchez-Revuelta et al.

[19]

[11] Patent Number: 5,808,906
[45] Date of Patent: Sep. 15, 1998

[54] INSTALLATION AND PROCESS FOR MEASURING ROLLING PARAMETERS BY MEANS OF ARTIFICIAL VISION ON WHEELS OF RAILWAY VEHICLES

[75] Inventors: Angel Luis Sanchez-Revuelta; Carlos-Javier Gómez Gómez, both of Madrid, Spain

[73] Assignee: Patentes Talgo, S.A., Madrid, Spain

[21] Appl. No.: 668,401

[22] Filed: Jun. 21, 1996

[30] Foreign Application Priority Data

Jun. 29, 1995 [ES] Spain .................................. 9501305

[51] Int. Cl.⁶ .............................. G01V 9/04; G01N 21/86
[52] U.S. Cl. ......................... 364/525; 364/560; 364/561; 364/562; 364/563; 356/356; 356/358; 356/384; 250/560
[58] Field of Search ..................... 364/525, 562, 364/560, 563, 561; 356/355, 356, 357, 358, 360, 381, 384, 385; 250/560

[56] References Cited

U.S. PATENT DOCUMENTS

| | | | |
|---|---|---|---|
| 4,155,526 | 5/1979 | Noble | 364/562 |
| 4,745,280 | 5/1988 | Gi et al. | 250/347 |
| 4,749,870 | 6/1988 | Schmalfuss et al. | 250/560 |
| 4,798,963 | 1/1989 | Witkopp et al. | 250/560 |
| 4,798,964 | 1/1989 | Schmalfuss et al. | 356/384 |
| 4,866,642 | 9/1989 | Obrig et al. | 364/562 |
| 4,932,784 | 6/1990 | Danneskidd-SamSoe | 356/376 |
| 4,989,984 | 2/1991 | Salinger | 356/381 |

*Primary Examiner*—Emanuel T. Voeltz
*Assistant Examiner*—Bryan Bui
*Attorney, Agent, or Firm*—Ladas & Parry

[57] ABSTRACT

A method and apparatus for measuring parameters of the wheels on a moving railway car in which the wheels travel on a steel slab and when a wheel passes a position sensor and is in a suitable position for measurement, a signal is produced which is supplied to a laser generator. The laser generator produces a planar laser beam which is directed onto the wheel. An image generated by the planar beam of light is captured by a camera in synchronization with the signal produced by the position sensor. The image is supplied to high-resolution artificial-vision electronic equipment whose output is supplied to a central control computer which processes the output and produces the desired information and displays it on a monitor. Separate laser generators can be used to produce separate beams for measuring wheel diameter and wheel profile and the separate generators are connected to separate electronic equipment in turn connected to the central control computer.

17 Claims, 3 Drawing Sheets

INSTALLATION AND PROCESS FOR MEASURING ROLLING PARAMETERS BY MEANS OF ARTIFICIAL VISION ON WHEELS OF RAILWAY VEHICLES

FIELD OF THE INVENTION

The present invention relates to the high-precision measurement of the rolling parameters of moving wheels on railway vehicles. Of these parameters, the most important include the following: thickness and height of the flange of the wheel, qR factor, diameter of the wheel and distance between internal faces. Similarly, according to the invention, a reproduction, including parameters, of the profile of the wheel is generated, making it possible to compare it with other standard profiles or to make any other type of measurement.

The invention is embodied in an installation for measuring the said parameters and in a corresponding operating process.

The installation of this invention may be constructed on any type of track on which the vehicles move, it being possible for it to be located inside or outside the sheds. The measurements made on the vehicles which are moving over these tracks are processed and sent to rolling-stock maintenance centers so that operations for rectifying any deficiencies detected in the condition of the wheels can be carried out there.

BACKGROUND OF THE INVENTION

The prior art has already dealt with the contact-free measuring of parameters of surface structures. Thus, Patent ES-A-499 366 describes a track-borne movable measuring vehicle which carries an emitter and a receiver of laser beams as well as means for indicating and, if appropriate, storing the measurement data for the surface studied; Patent ES-A-2 054 398 relates to a track-borne vehicle for measuring the geometric parameters of a railway track using a proximeter and optical distance gauges; also, Patent EP-A-0 461 119 discloses a device for interferometric measurement of surface structures which includes at least two laser sources and which is used to measure the phase difference in pairs of laser beams at set measurement points on the surface investigated. All these measurement systems apply to fixed surface structures, such as tracks, tunnel openings and defiles, but, unlike the present invention, they do not make it possible to measure parameters of moving objects, such as the wheels of a vehicle. Similarly, Patent EP-A-0 467 984 shows a plant for detecting the wheel profile of trains with the aid of an illuminating unit, a scanning unit, a measuring unit and a data processor. However, the technological principles on which said plant is based differ from those used to develop this invention.

Therefore, the problem posed by the invention has hitherto not been dealt with or solved in the manner and under the conditions faced by it, which means that the installation and the process set forth in this specification are novel and offer an inventive step vis-à-vis the known state of the art.

SUMMARY OF THE INVENTION

In basic terms, the invention consists in the generation of a planar beam of laser light which falls upon the wheel to be measured in its lower part by virtue of a rail which is specially designed to act as a support for the wheel of the train on the flange or in its outermost part, depending on whether the diameter or the profile of the wheel is being measured. In this way, it is possible to take images of the projection of the circumference of the wheel, formed by the laser beam, in the zone with the lowest instantaneous speed of movement and with reference to the support rail. Clearer, less distorted images are thus obtained at greater speed.

According to the invention, an installation for the measurement of the said rolling parameters comprises a steel slab on which the wheel which it is desired to measure runs, a guard rail which interacts with said steel slab to prevent derailment, a wheel-position sensor which emits a signal when the wheel is in a suitable position for measurement, a laser generator which, upon being activated by said signal, projects a planar beam of laser light onto the wheel, a camera with lens and filter which captures the image generated by said planar beam of light, a controller for illuminating and capturing the image which synchronizes the acquisition of the image through the wheel-position sensor, and high-resolution artificial-vision electronic equipment which analyzes the image captured by said camera and which sends the measurements obtained to a central control computer where they are processed and visualized.

The image generated by the planar beam of light may consist of the profile of the wheel with reference to the steel slab, in which case said image is obtained with the aid of an interior illumination mirror, or other laser generator, which interacts with the laser generator already mentioned. As an alternative, the image generated by the planar beam of light may consist of a line formed on the wheel and symbolizing the diameter of the wheel.

According to the invention, the equipment for measuring the profile of the wheel together with the distance between internal faces and the equipment for measuring the diameter thereof may be incorporated inside one and the same unit. Alternatively, it is also possible for the equipment for measuring the profile of the wheel together with the distance between internal faces and the equipment for measuring the diameter thereof to be autonomous and capable of functioning independently of each other.

Except for the central control computer, which is common to all the wheels which are to be measured, the remaining elements of the installation of the invention corresponding to one wheel are repeated for the opposite wheel.

Moreover, a process for measuring rolling parameters by means of artificial vision on wheels mounted on railway vehicles which are moving, in which use is made of the installation of the invention, consists in that, for measuring the profile of the wheel, the latter is caused to run, resting via its outermost part on the steel slab, whereby the wheel-position sensor is activated, causing the laser generator to project a planar beam of laser light onto the wheel and production of an image corresponding to the profile of the wheel with the aid of the mirror or other laser generator; this image is captured with the corresponding camera and is sent to the artificial-vision electronic analysis equipment; and the measurements and parameters of the profile of the wheel obtained in said analysis equipment are transmitted to the central computer for it to process them together with those of the opposite wheel and generate the wheel-measurement report, the result obtained being visualized on the monitor.

An alternative process for measuring rolling parameters by means of artificial vision on wheels mounted on railway vehicles which are moving at, in which use is also made of the installation of the invention, consists in that, for measuring the diameter of the wheel, this is caused to run, resting on the steel slab via the flange, whereby the wheel-position sensor is activated, causing the laser generator to project a planar beam of laser light onto the wheel and production of an image in the form of a line representing the diameter of the wheel; this image is captured with the corresponding camera and is sent to the artificial-vision electronic analysis equipment; and the measurement of the diameter of the wheel obtained in said analysis equipment is transmitted to the central computer for it to process it and generate the wheel-measurement report, the result obtained being visualized on the monitor.

The measurement of the profile of the wheel together with the distance between internal faces and the measurement of the diameter thereof may be achieved with measurement components which form part of a single unit. As an alternative, it is possible for the measurement of the profile of the wheel together with the distance between internal faces and the measurement of the diameter thereof to be achieved with measurement components which form part of two units capable of functioning independently of each other.

BRIEF DESCRIPTION OF THE DRAWINGS

A more detailed description of the invention is now given, with reference to the appended drawings, in which an installation embodied according to the invention is diagrammatically illustrated.

DETAILED DESCRIPTION OF THE INVENTION

Figure 1B:
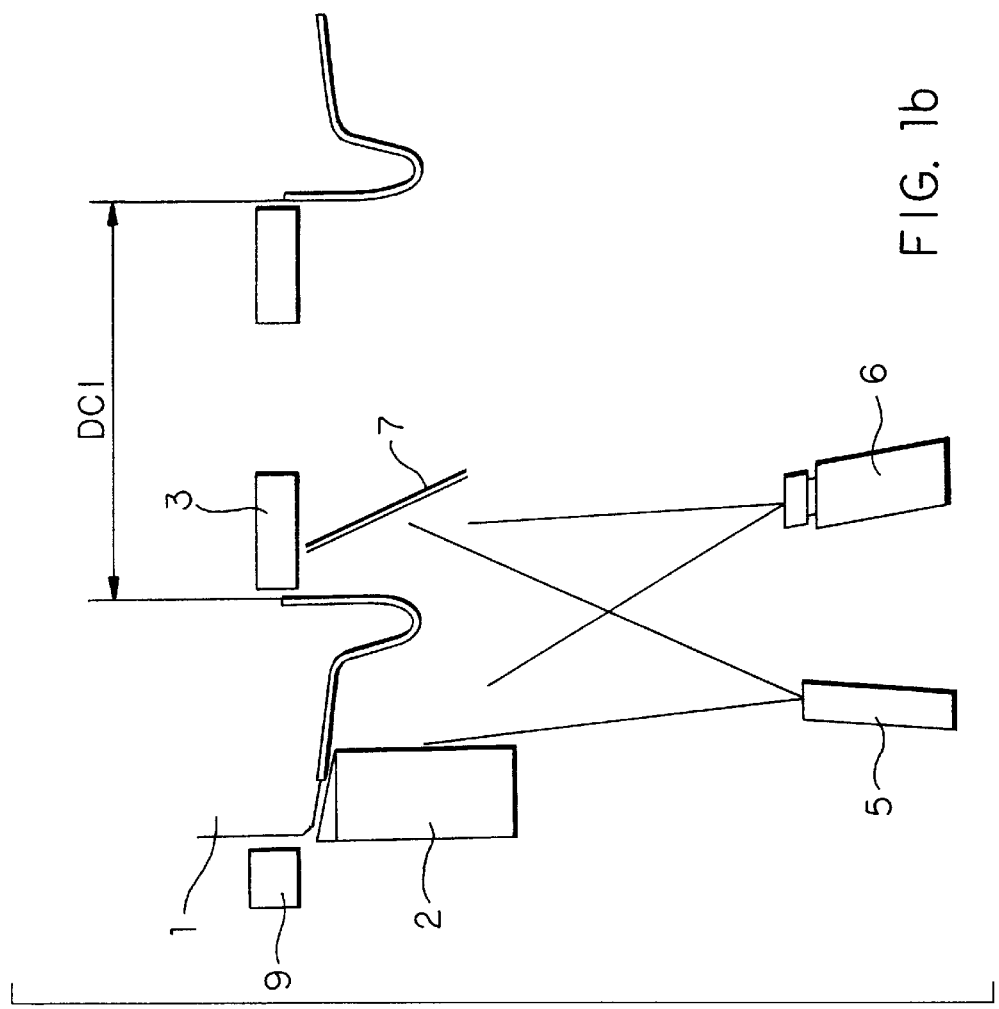
FIG. 1b shows the apparatus in an end view, on enlarged scale, of a lower portion of the wheel.
Figure 1A:
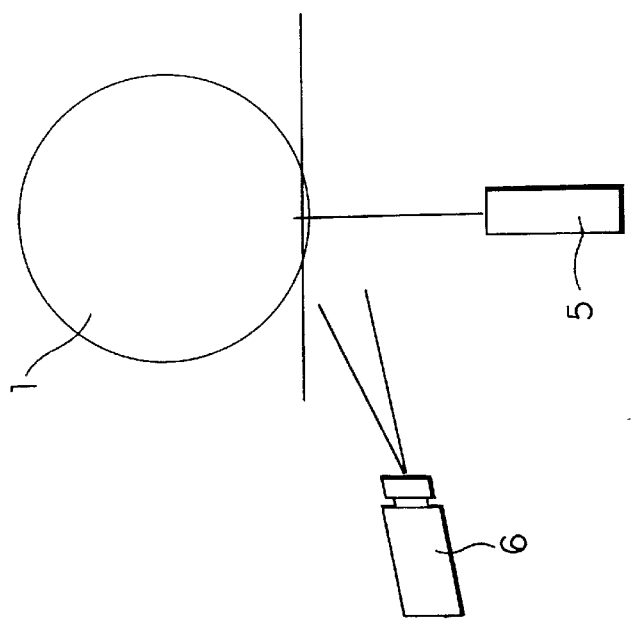
FIG. 1a diagrammatically shows the installation of the invention for the measurement of the profile of a wheel; seen from a side elevation view of a wheel.

With reference, firstly, to FIGS. 1a and 1b of the drawings, it is pointed out that, for measuring the profile of a wheel (the same measurement on the opposite wheel is carried out at the same time), the installation of the invention comprises a specially designed rolling support or steel slab 2 on which the outermost part of the wheel 1 which it is desired to measure is caused to roll and which has a guard rail 3 which prevents derailment. Therefore, the rolling zone which it is desired to analyze remains free, this free zone being equal to at least 75 mm for a wheel-rim width of 135 mm. On one side of the steel slab 2 is a wheel-position sensor 9 which, when the wheel passes the sensor, sends a signal to a laser-beam generator 5 which is then activated and projects a planar beam of laser light onto the wheel. With the aid of a mirror 7 for interior illumination (or with the aid of a second laser generator), this beam generates the shaded profile 4. The image of this profile is captured by a camera 6 equipped with a lens and filter and is sent, to be analyzed, to high-resolution artificial-vision electronic equipment 11, illustrated in FIG. 3. The position of the profile 4 with respect to the stationary parts 2 and 3 makes it possible to obtain the distance between internal faces DCI by computing the values for both wheels.

Figure 2:
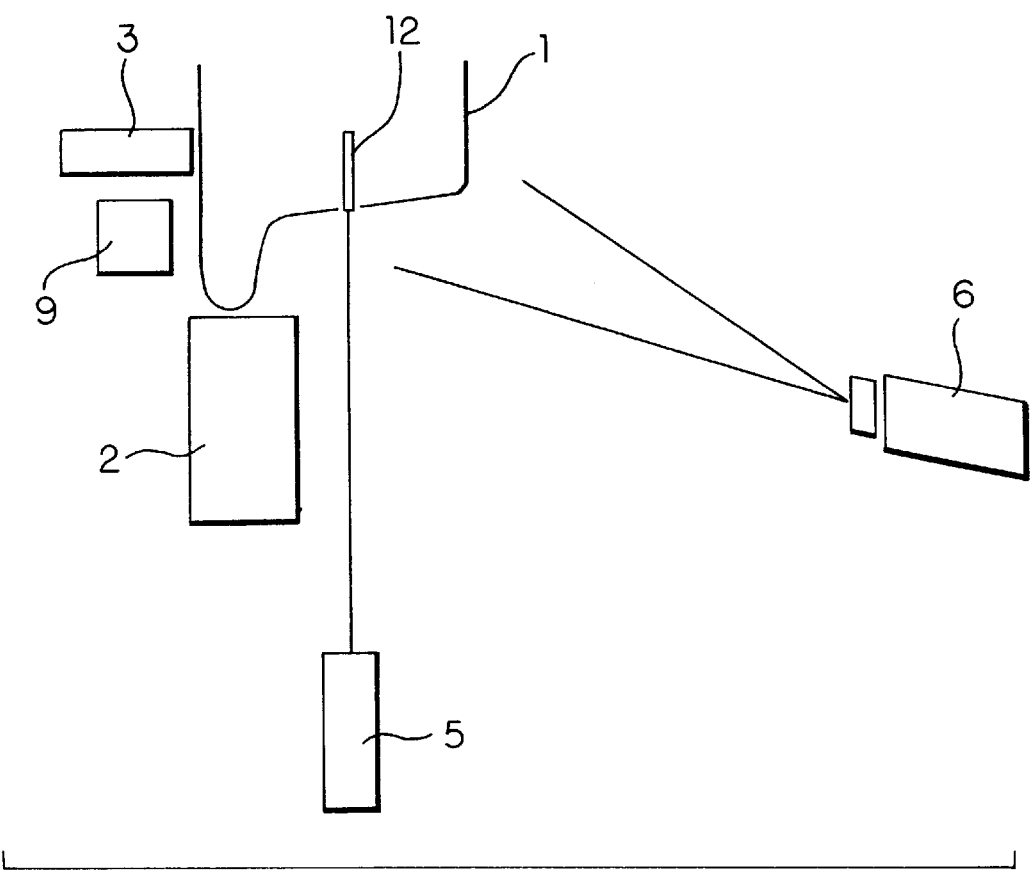
FIG. 2 shows the installation of the invention for the measurement of the diameter of the wheel, and FIG. 3 diagrammatically illustrates a complete measuring installation according to the invention.

The installation of the invention which is shown in FIG. 2 of the drawings, prepared for measuring the diameter of a wheel, differs, in basic respect, from the installation shown in FIG. 1 insofar as the image is taken perpendicularly. In the installation of FIG. 2, the wheel 1 runs while resting via its flange and while guided by means of the steel slab 2 and the guard rail 3. As in FIGS. 1a and 1b, the position sensor 9 emits a signal as the wheel passes the sensor and thus activates the laser generator 5 which projects a planar beam of laser light onto the wheel, a line 12 then being generated on the wheel. The image of this line is captured with the camera 6 and analyzed by the artificial-vision electronic equipment 11.

Figure 3:
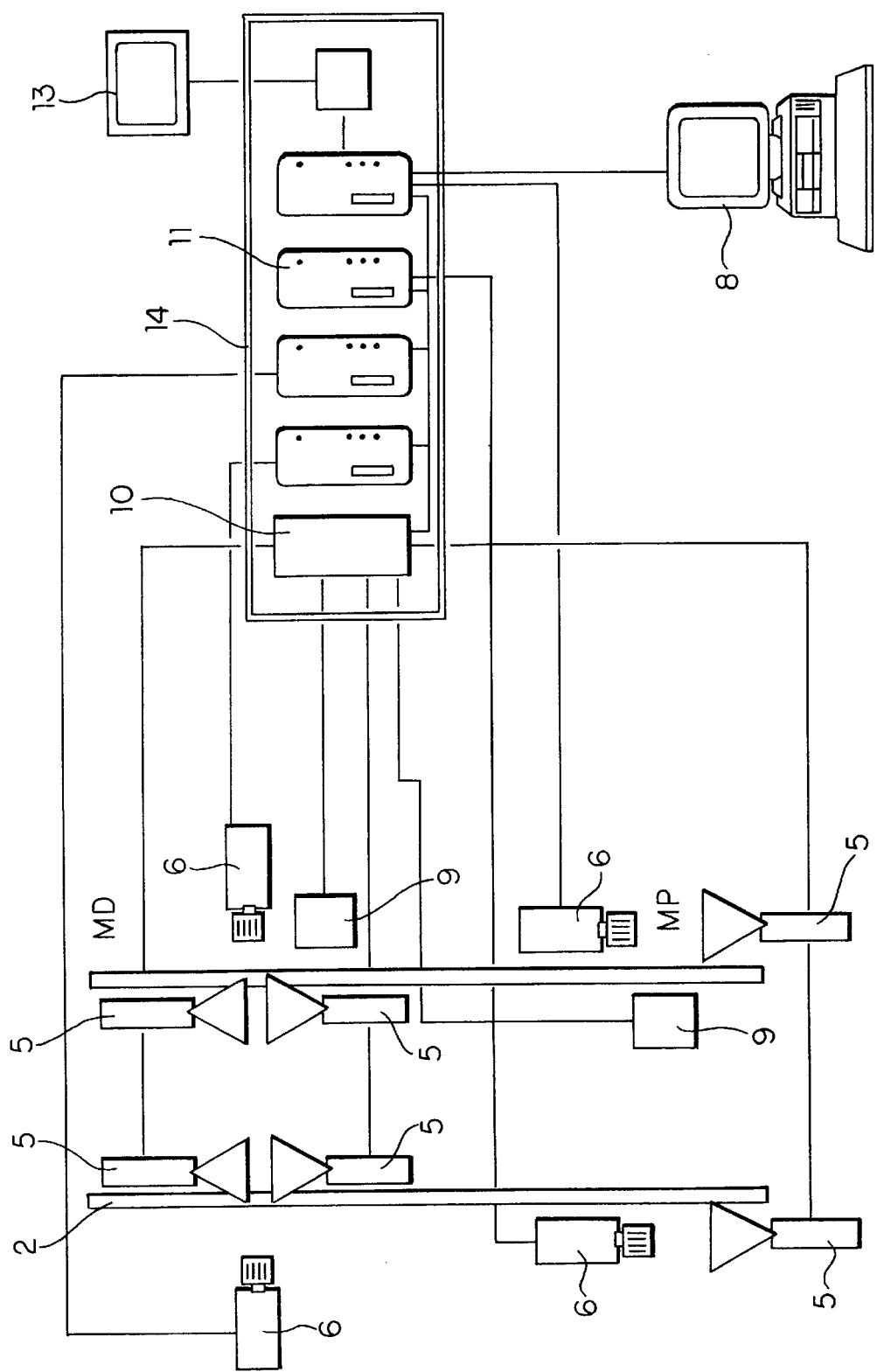

The measurement installation of the invention is shown in its entirety in FIG. 3. The rolling steel slabs 2 serve as supports for the cameras 6 and the laser generators 5. A controller 10 for illuminating and capturing the image serves to synchronize the acquisition of the images by means of the position sensors 9. These images are analyzed by the electronic vision equipment 11 which sends the measurements and parameters of the profile of the wheel, as well as the measurement of its diameter, to the central control computer 8 where said data are processed to generate the measurement reports for the vehicles, the result being visualized on the monitor 13.

A control cabinet 14 is provided for housing the controller 10 and the artificial-vision equipment 11, as well as other components of the system.

In FIG. 3, the part MD is prepared for measuring the diameter of the wheels, whilst the part MP is intended for measuring the profile and the distance between internal faces of the wheels.

The operating process of the installation according to the invention may be inferred from the preceding description of the figures of the drawings and consists, in basic terms, in that a position-detection system (position sensor 9) activates, for each wheel of the vehicle which is passing the sensor, the acquisition of the corresponding image by means of the cameras 6 which are equipped with a filter having the same frequency as the wavelength of the laser produced by the generator 5, thus eliminating the influence of ambient light. The image picked up by the cameras is analyzed and corrected geometrically in real time by the high-resolution vision equipment 11, thus making it possible to obtain a high level of precision in the measurements. The invention also makes it possible for acceptable passing speeds to be achieved on vehicles with a wheelbase of 1800 mm.

As may be ascertained from the preceding description, the installation consists of two distinct parts, the first of which consists of the equipment for measuring the profile of the wheel, whilst the second consists of the equipment for measuring the diameter of said wheel. These two parts may form a single installation or, alternatively, may operate independently of each other.

The preceding description of the invention has been made with reference to what constitutes the currently preferred illustrative embodiment thereof. However, as experts in the field will understand, some modifications of form and detail may be made in the installation described and illustrated, as in the component arrangement, without thereby departing from the scope of the invention. Therefore, the intention is that the scope of the invention should be limited solely and exclusively by the contents of the appended claims.

What is claimed is:

1. Installation for measuring rolling parameters by means of artificial vision on wheels mounted on moving railway vehicles, in which, the parameters include the thickness and the height of the flange of the wheel, qR factor, the diameter of the wheel and the distance between internal faces of opposite wheels, and in which a reproduction of the profile of the wheel is generated, said installation comprising a steel slab (2) on which a wheel (1) whose parameters are to be measured runs, a guard rail (3) which cooperates with said steel slab to prevent derailment of said wheel, a wheel-position sensor (9) which emits a signal when the wheel is in a suitable position for measurement, a laser generator (5) which is activated by said signal to project a planar beam of laser light onto the wheel, a camera (6) with lens and filter which captures the image generated by said planar beam of light, a controller (10) for illuminating and capturing the image which synchronizes the acquisition of the image through the wheel-position sensor (9), high-resolution artificial-vision electronic equipment (11) which analyzes the image captured by said camera and which sends the measurements obtained to a central control computer (8) where the measurements are processed and displayed on a monitor (13), said high-resolution artificial-vision electronic equipment including first equipment for producing measurements regarding the profile of the wheel (1) and second equipment for producing measurements regarding the diameter of the wheel, said first and second equipment being autonomous and capable of functioning independently of each other.

2. Installation according to claim 1, wherein the image generated by the planar beam of light consists of the profile (4) of the wheel (1) and is obtained with an interior illumination mirror (7), or a second laser generator, which cooperates with the first said laser generator (5).

3. Installation according to claim 1, wherein the image generated by the planar beam of light consists of a line (12) on the wheel (1) which symbolizes the diameter thereof.

4. Installation according to claim 1 wherein the equipment for measuring the profile of the wheel (1) and the equipment for measuring the diameter thereof are incorporated inside the same unit.

5. Installation according to claim 1, wherein the railway vehicle has a second wheel opposite the first said wheel and said installation further comprises, for said second wheel, a corresponding second guard rail, a corresponding second steel slab, a corresponding second sensor, a corresponding second laser generator and a corresponding second camera which captures an image of the second wheel generated by a planar beam of light produced by said second laser generator, said image of the second wheel being sent, to corresponding electronic equipment connected to said central control computer in which the distance between opposite faces of the first and second wheels is determined and supplied to said monitor.

6. Installation according to claim 1, wherein only an outer portion of said wheel rests on said slab so that a major remaining portion of the wheel, including an inner flange on said wheel, is exposed to said laser beam and said image produced by said camera is a profile of said major portion.

7. Installation according to claim 6, comprising means for laser beam illuminating an inner face of said wheel at said flange.

8. Installation according to claim 1, wherein the image of the profile of the wheel and the image for obtaining the diameter of the wheel are respectively produced at longitudinally spaced locations along said steel slab.

9. Installation according to claim 1, wherein said wheel includes a flange and, for measuring the wheel diameter, said flange rides on said steel slab.

10. A process for measuring parameters of wheels mounted on moving railway vehicles comprising:

advancing the wheels of a moving railway vehicle on steel slabs which support the wheels on outer portions of the wheels, producing a signal from a wheel-position sensor when an associated wheel travels past said sensor, activating a laser generator by said signal to produce a planar beam of laser light directed onto said associated wheel, producing, by a camera, an image of the associated wheel illuminated by said beam of laser light, synchronizing the production of said image of the associated wheel by its associated said sensor, supplying the said image to artificial-vision electronic analysis equipment, supplying an output of said artificial-vision electronic analysis equipment to a computer in which the desired parameters are obtained and displayed on a monitor, and wherein the measurement of the profile of the wheel and of the distance between inner faces of opposite wheels, and the measurement of the diameter of the wheel are achieved with measurement components which form part of a single unit.

11. A method according to claim 10, wherein for measuring the diameter of the wheel, the flange of the wheel travels on the steel slab and the laser generator produces an image in the form of a line on the circumference of the wheel which line is representative of the diameter of the wheel.

12. A method according to claim 10, comprising supporting only an outer portion of said wheel on said slab so that a major remaining portion of the wheel including an inner flange on the wheel is exposed to said laser beam and the image produced by the camera is a profile of said major portion including said flange.

13. A method according to claim 12, comprising illuminating an inner surface of said flange as part of said profile.

14. A process for measuring parameters of wheels mounted on moving railway vehicles comprising:

advancing the wheels of a moving railway vehicle on steel slabs which support the wheels on outer portions of the wheels, producing a signal from a wheel-position sensor when an associated wheel travels past said sensor, activating a laser generator by said signal to produce a planar beam of laser light directed onto said associated wheel, producing, by a camera, an image of the associated wheel illuminated by said beam of laser light, synchronizing the production of said image of the associated wheel by its associated said sensor, supplying the said image to artificial-vision electronic analysis equipment, supplying an output of said artificial-vision electronic analysis equipment to a computer in which the desired parameters are obtained and displayed on a monitor, and wherein the measurement of the profile of the wheel and of the distance between inner faces of opposite wheels and the measurement of the diameter of the wheel are achieved with measurement components which form part of two autonomous units capable of functioning independently of each other.

15. A method according to claim 14, wherein for measuring the diameter of the wheel, the flange of the wheel travels on the steel slab and the laser generator produces an image int he form of a line on the circumference of the wheel which line is representative of the diameter of the wheel.

16. A method according to claim 14, comprising supporting only an outer portion of said wheel on said slab so that a major remaining portion of the wheel including an inner flange on the wheel is exposed to said laser beam and the image produced by the camera is a profile of said major portion including said flange.

17. A method according to claim 16, comprising illuminating an inner surface of said wheel as part of said profile.

* * * * *